US012370489B2

(12) United States Patent
Cho et al.

(10) Patent No.: US 12,370,489 B2
(45) Date of Patent: Jul. 29, 2025

(54) DRYING DEVICE FOR RECYCLING ADSORBENT BY USING MICROWAVES

(71) Applicant: ECOPROHN, Cheongju-si (KR)

(72) Inventors: Byoung Cheol Cho, Cheongju-si (KR); Woo Jin Yun, Chungcheongbuk-do (KR); Myoung Hwan Yoo, Cheongju-si (KR); Hyun Wook Lee, Cheongju-si (KR); Sang Jun Park, Cheongju-si (KR)

(73) Assignee: ECOPROHN, Cheongju-si (KR)

( * ) Notice: Subject to any disclaimer, the term of this patent is extended or adjusted under 35 U.S.C. 154(b) by 641 days.

(21) Appl. No.: 17/758,123

(22) PCT Filed: Sep. 7, 2021

(86) PCT No.: PCT/KR2021/012108
§ 371 (c)(1),
(2) Date: Jun. 28, 2022

(87) PCT Pub. No.: WO2022/055216
PCT Pub. Date: Mar. 17, 2022

(65) Prior Publication Data
US 2023/0038117 A1 Feb. 9, 2023

(30) Foreign Application Priority Data

Sep. 10, 2020 (KR) .................. 10-2020-0115804

(51) Int. Cl.
*B01D 53/04* (2006.01)
*B01D 53/26* (2006.01)
(Continued)

(52) U.S. Cl.
CPC ..... *B01D 53/0438* (2013.01); *B01D 53/0423* (2013.01); *B01D 53/261* (2013.01);
(Continued)

(58) Field of Classification Search
CPC .......................... B01D 53/04; B01D 53/0438; B01D 53/0423; B01D 53/261; B01D 53/0462;
(Continued)

(56) References Cited

U.S. PATENT DOCUMENTS 4,421,651 A * 12/1983 Burkholder ............ B01D 53/04
502/56
4,931,756 A 6/1990 Doehler et al.
(Continued)

FOREIGN PATENT DOCUMENTS

CN 110813017 A 2/2020
JP S63-041611 B2 8/1988
(Continued)

OTHER PUBLICATIONS

Partial Supplementary European Search Report of corresponding European Patent Application No. 21867082.6 issued on Jan. 8, 2024.
(Continued)

*Primary Examiner* — Frank M Lawrence, Jr.
(74) *Attorney, Agent, or Firm* — Knobbe, Martens, Olson & Bear, LLP

(57) ABSTRACT

The present invention relates to a drying apparatus capable of regenerating an adsorbent used for drying using microwaves. The drying apparatus of the present invention is formed to include a microwave irradiation means configured to irradiate microwaves to the adsorbent in a plurality of reaction towers in which the adsorbent adsorbing moisture or carbon dioxide is embedded, and when regenerating the adsorbent, directly heats the adsorbent using microwaves, thereby shortening a heating time and securing a sufficient cooling time, resulting in the effect of reducing the amount of dry air consumed for cooling and further increasing the drying efficiency.

17 Claims, 13 Drawing Sheets

(51) Int. Cl.
*B01J 20/34* (2006.01)
*H05B 6/64* (2006.01)
*H05B 6/70* (2006.01)
*H05B 6/80* (2006.01)

(52) U.S. Cl.
CPC .......... *H05B 6/6473* (2013.01); *H05B 6/707* (2013.01); *H05B 6/80* (2013.01); *B01D 2257/504* (2013.01); *B01D 2257/80* (2013.01); *B01D 2259/4009* (2013.01); *B01D 2259/40094* (2013.01); *H05B 2206/046* (2013.01)

(58) Field of Classification Search
CPC .......... B01D 2257/504; B01D 2257/80; B01D 2259/4009; B01D 2259/40094; B01J 20/3441; Y02C 20/40; H05B 6/6473; H05B 6/707; H05B 6/80; H05B 2206/046
USPC .... 95/114, 117, 122, 123, 126, 139; 96/121, 96/126–128, 130, 143, 144, 146; 34/80, 34/472, 473
See application file for complete search history.

(56) References Cited

U.S. PATENT DOCUMENTS

| | | | |
|---|---|---|---|
| 6,511,643 B1* | 1/2003 | Schmidt-Traub | .... B01J 20/3441 |
| | | | 423/245.1 |
| 2012/0048111 A1 | 3/2012 | Nakao et al. | |
| 2016/0339388 A1* | 11/2016 | Lee | .......... B01D 53/72 |
| 2018/0001250 A1* | 1/2018 | Lee | .......... B01D 53/261 |
| 2023/0302393 A1* | 9/2023 | Qi | .......... B01D 53/02 |

FOREIGN PATENT DOCUMENTS

| | | |
|---|---|---|
| JP | 2006-012605 A | 1/2006 |
| JP | 2011-253653 A | 12/2011 |
| KR | 101559019 B1 | 10/2015 |
| KR | 102058156 B1 | 12/2019 |

OTHER PUBLICATIONS

International Search Report in PCT Application No. PCT/KR2021/012108 dated Dec. 21, 2021 in 5 pages.

\* cited by examiner

DRYING DEVICE FOR RECYCLING ADSORBENT BY USING MICROWAVES

TECHNICAL FIELD

The present invention relates to a drying apparatus removing moisture or carbon dioxide included in gas such as air, and more particularly, to a drying apparatus capable of regenerating an adsorbent used for drying using microwaves.

BACKGROUND ART

A drying apparatus, which is a device that removes (adsorbs) moisture or carbon dioxide from the air, is widely used in various production processes such as semiconductor manufacturing processes, chemical processes, and a type of condensing and removing moisture and a type of dehumidifying using an adsorbent have been proposed. A drying apparatus of the type of condensing and removing moisture uses a refrigeration compressor to lower the temperature of compressed air and condense moisture and dehumidify, and may have a problem of environmental pollution due to a high power consumption for refrigeration and the use of a refrigerant. A drying apparatus that dehumidifies using an adsorbent is to dehumidify or remove (adsorb) carbon dioxide by making air to be dried pass through an adsorption tower with the adsorbent, and has a disadvantage in that a process of heating and regenerating the adsorbent after adsorbing moisture or carbon dioxide is required.

In order to solve this problem, two adsorption towers usually perform dehumidification and regeneration alternately, in which one adsorption tower removes (adsorbs) moisture or carbon dioxide from the air, and the other adsorption tower heats the adsorbent and then cools and regenerates the adsorbent. At this time, when a heating time for regeneration of the adsorbent increases, since a sufficient cooling time may not be secured, cooling is performed using a lot of dry air in a short time, resulting in waste of dry air for regeneration of the adsorbent, which may cause a problem of lowering efficiency. For example, when a cooling time of 3 hours is secured, the adsorbent may be sufficiently cooled with only 30 cubic meters of dry air per hour, whereas when a cooling time is only 1.5 hours under the same conditions, 70 cubic meters of dry air per hour is required to cool the adsorbent, and thus 15 cubic meters of dry air is further used.

Accordingly, it is necessary to secure a sufficient cooling time by shortening a heating time in a regeneration process of the adsorbent, and through this, a solution for saving dry air required for regeneration of the adsorbent is required.

DISCLOSURE

Technical Tasks

An object of the present invention is to provide a drying apparatus capable of increasing air drying (adsorption) efficiency in which a heating time may be reduced by indirect heating using heated air and direct heating of an adsorbent using microwaves simultaneously during regeneration so that an amount of dry air (dehydrated air) consumed for heating and cooling during regeneration may be reduced, and increasing energy efficiency through a direct heating method compared with an indirect heating method.

In addition, an object of the present invention is to provide a drying apparatus, in which a protruding guide and a protruding seating part are formed in a reaction tower, and a certain region of a waveguide is inserted into and fixed to a microwave irradiation means, capable of being easy to assemble and mount as well as, in which an adsorbent is directly irradiated with microwaves to be heatable, capable of achieving regeneration by more effectively heating the adsorbent.

In addition, an object of the present invention is to provide a drying apparatus configured to evenly transmit microwaves to an inside of a reaction tower and prevent the gas inside from leaking.

Technical Solution

A drying apparatus of the present invention includes a plurality of reaction towers in which an adsorbent adsorbing moisture or carbon dioxide is embedded; a pipe connected to the reaction tower and transporting air; valves provided on the pipe and controlling an air flow; and a microwave irradiation portion configured to irradiate microwaves to the adsorbent inside the reaction tower, wherein the microwave irradiation unit is configured to operate in the reaction tower in which regeneration of the adsorbent is performed, wherein a hollow portion in which a certain region provided with the microwave irradiation portion is hollow is formed in the reaction tower, and wherein the microwave irradiation portion includes a magnetron configured to selectively irradiate microwaves, and a microwave waveguide configured to transmit microwaves to the adsorbent through the hollow portion.

The drying apparatus may include, on the pipe, a regeneration air supply portion configured to supply air for regeneration of the adsorbent; and a heating portion configured to heat the air for regeneration.

The heated air for regeneration of the adsorbent may be supplied to the reaction tower in which regeneration is performed through the regeneration air supply portion and the heating portion so that the adsorbent is indirectly heated, and the microwave irradiation portion may be configured to operate so that the adsorbent is directly heated.

The air that has passed through the reaction tower in which adsorption is performed may be supplied to the reaction tower in which regeneration is performed by operations of the valves.

A protrusion guide configured to protrude outward from an inner circumferential surface of the hollow portion may be formed in the reaction tower, and a microwave waveguide of the microwave irradiation portion may include a transmission plate inserted into the reaction tower through the hollow portion and allowing microwaves to pass therethrough, an insertion portion inserted along an inside of the protrusion guide, and a fixing portion provided at an end of the reaction tower of the insertion portion and configured to fix the transmission plate.

The waveguide may further include a sealing member between the transmission plate and the fixing portion.

The microwave irradiation portion may be provided in plurality in a circumferential direction of the reaction tower or provided in plurality in a height direction.

A welding pad having a through hole formed in the hollow portion of the reaction tower may be welded and attached, the transmission plate of a certain thickness configured to block a through hole region of the welding pad may be inserted and disposed, and a fixing portion integrated microwave apparatus in which the microwave irradiation portion, the waveguide, and the fixing portion are integrally formed may be combined with the welding pad.

Protection plates may be disposed on both sides of an outer surface of the transmission plate.

The microwave irradiation portion may include a microwave waveguide formed in an annular shape on an inside of the reaction tower.

The microwave waveguide may include an internal circular waveguide formed in an annular shape inside the reaction tower and an external insertion waveguide inserted into the internal circular waveguide.

The internal circular waveguide may include a circular waveguide body formed in an annular shape, an insertion hole formed to be hollow on an outer periphery of the circular waveguide body and into which the external insertion waveguide is inserted, and a plurality of slits formed on an inner periphery of the circular waveguide body and configured to irradiate microwaves to the inside.

The external insertion waveguide may include the insertion portion inserted into the circular waveguide body, the transmission plate formed at one end of the insertion portion and allowing microwaves to pass through, a corresponding portion formed on the other side of the insertion portion and configured to fix the external insertion waveguide to the reaction tower, and a connection portion formed on one side of the external insertion waveguide and configured to connect a magnetron generating microwaves.

A microwave waveguide transmitting microwaves into a reaction tower to heat an adsorbent of a drying apparatus includes a transmission plate inserted into a reaction tower through a hollow portion formed in the reaction tower of the drying apparatus and allowing microwaves to pass therethrough; an insertion portion inserted along an inside of a protrusion guide; and a fixing portion provided at an end of the reaction tower of the insertion portion and configured to fix the transmission plate.

A microwave waveguide transmitting microwaves into a reaction tower to heat an adsorbent of a drying apparatus includes an internal circular waveguide formed in an annular shape inside a reaction tower of the drying apparatus; and an external insertion waveguide inserted into the internal circular waveguide.

The internal circular waveguide may include a circular waveguide body formed in an annular shape, an insertion hole formed to be hollow on an outer periphery of the circular waveguide body and into which the external insertion waveguide is inserted, and a plurality of slits formed on an inner periphery of the circular waveguide body and configured to irradiate microwaves to the inside.

The external insertion waveguide may include an insertion portion inserted into the circular waveguide body, a transmission plate formed at one end of the insertion portion and allowing microwaves to pass through, a corresponding portion formed on the other side of the insertion portion and configured to fix the external insertion waveguide to the reaction tower, and a connection portion formed on one side of the external insertion waveguide and configured to connect a magnetron generating microwaves.

Effects

Accordingly, the drying apparatus of the present invention has an advantage of increasing air drying (adsorption) efficiency in which a heating time may be reduced by indirect heating using heated air and direct heating of the adsorbent using microwaves simultaneously during regeneration so that an amount of dry air consumed for heating and cooling during regeneration may be reduced.

In addition, the drying apparatus of the present invention, in which the protruding guide and the protruding seating part are formed in the reaction tower, and a certain region of the waveguide is inserted into and fixed to the microwave irradiation means, has an advantage of being easy to assemble and mount as well as, in which the adsorbent is directly irradiated with microwaves to be heatable, an advantage of using microwaves to achieve regeneration by more effectively heating the adsorbent.

In addition, the microwave waveguide is inserted into the inside of the reaction tower, and thus there is an effect of evenly transmitting microwaves to the adsorbent and preventing the gas inside from leaking. In addition, the microwave waveguide is arranged in an annular shape inside the reaction tower, and thus there is an effect of evenly heating the adsorbent.

EMBODIMENTS

Figure 1:
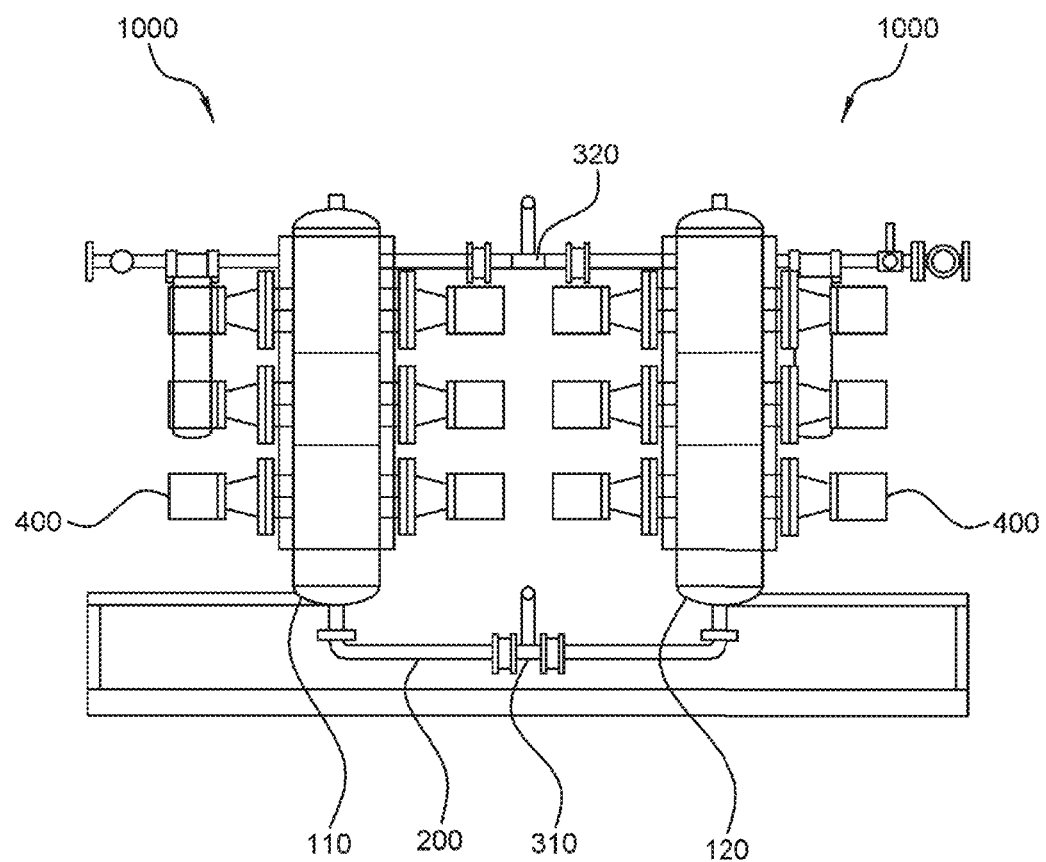
FIG. 1 is a schematic diagram of a drying apparatus according to the present invention.

Hereinafter, specific embodiments and features of the present invention will be described in detail with reference to the accompanying drawings. However, the present invention is not limited to the drawings and specific embodiments, but may be embodied in various different forms, the present embodiments are provided to complete the disclosure of the present invention, and to completely inform the scope of the invention to those of ordinary skill in the art to which the present invention belongs, and the present invention is merely defined by the claims. Also, like reference numerals refer to like elements throughout the specification.

In the following description and accompanying drawings, descriptions of well-known functions and configurations that can unnecessarily obscure the gist of the present invention will be omitted. In addition, the terms to be described below are terms defined in consideration of functions in an embodiment of the present invention, which may vary according to intentions or customs of users and operators. Therefore, the definition should be made based on the description throughout the specification.

Hereinafter, the features described above will be described in detail with respect to a drying apparatus regenerating an adsorbent using microwaves according to the present invention with reference to the accompanying drawings.

Figure 2:
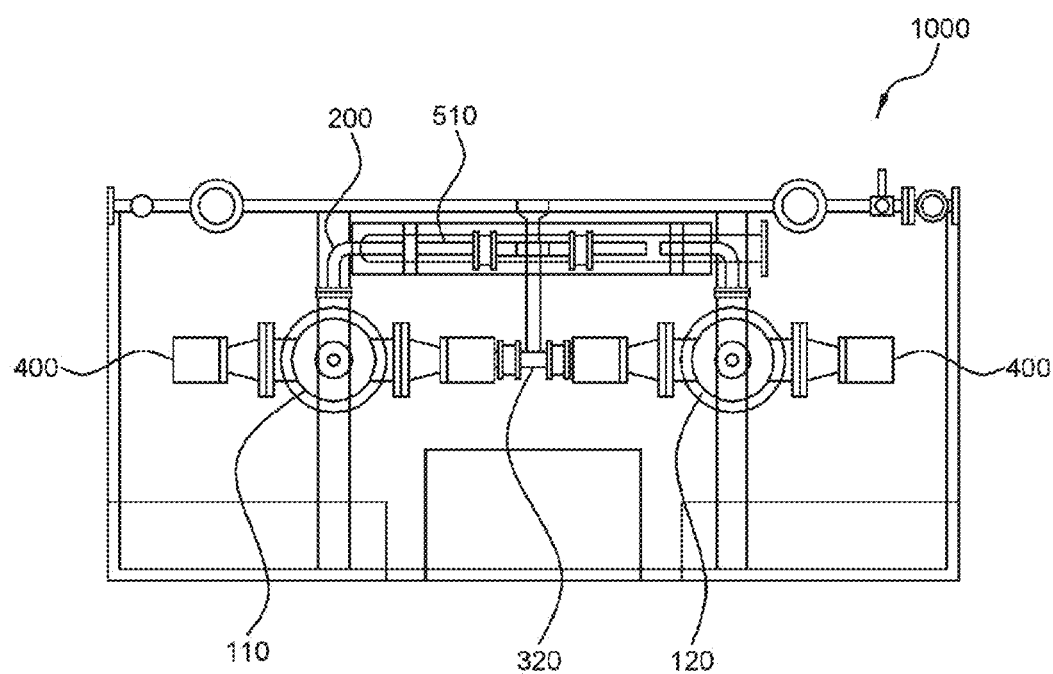
FIG. 2 is a schematic top view of the drying apparatus according to the present invention.

First, FIGS. 1 and 2 are schematic diagrams of a drying apparatus regenerating an adsorbent using microwaves according to the present invention. Referring to FIGS. 1 and 2, the drying apparatus of the present invention is configured to include a plurality of reaction towers 100, a pipe 200, valves 310 and 320, and a microwave irradiation portion 400.

In the reaction tower 100, an adsorbent capable of adsorbing moisture or carbon dioxide is embedded, gas, such as air, which requires removal of moisture and carbon dioxide, is supplied to the inside of the reaction tower 100 and moved so that moisture or carbon dioxide is removed and discharged by the adsorbent disposed therein, and drying is performed. At this time, since the adsorbent of the reaction tower 100 in which drying is performed needs regeneration for a next use, the plurality of reaction towers 100 are provided for continuous drying, and drying and regeneration of the adsorbent are alternately performed. In the accompanying drawings, it is shown that the reaction towers 100 are in a form provided in two, but this is a minimum form, and may be formed in a plurality of two or more, in this case, each reaction tower performs drying and regeneration of the adsorbent sequentially or alternately in pairs. That is, when the two reaction towers 100 are provided, while one reaction tower 100 performs drying, the other reaction tower 100 performs regeneration of the adsorbent. That is, upon describing the case in which the two reaction towers 100 are referred to as a first reaction tower 110 and a second reaction tower 120, when the first reaction tower 110 performs drying, the second reaction tower 120 performs regeneration, and when the first reaction tower 110 performs regeneration, the second reaction tower 120 performs drying.

The pipe 200 is a configuration to supply and discharge air to the reaction towers 100, and the valves 310 and 320 are provided on the pipe 200 to control an air flow.

The microwave irradiation portion 400 of the present invention means a configuration including a magnetron (not shown) that irradiates microwaves to the adsorbent inside the reaction tower 100, and the microwave irradiation portion 400 of the present invention may be configured to directly irradiate microwaves onto the adsorbent inside the reaction tower 100 by using a waveguide having a predetermined region inserted into the reaction tower 100. The shapes of the waveguide and the reaction tower in this regard will be described again below.

Meanwhile, referring to FIG. 2, the drying apparatus 1000 of the present invention may further include a heating portion 510 heating the air for regenerating the adsorbent on the pipe 200. The heating portion 510 is a configuration to indirectly heat the adsorbent by supplying heated air when the adsorbent is regenerated, and dries the adsorbent by heating the air for regeneration supplied from the outside and supplying the same to the inside of the reaction tower 100 where the adsorbent is regenerated.

Figure 3:
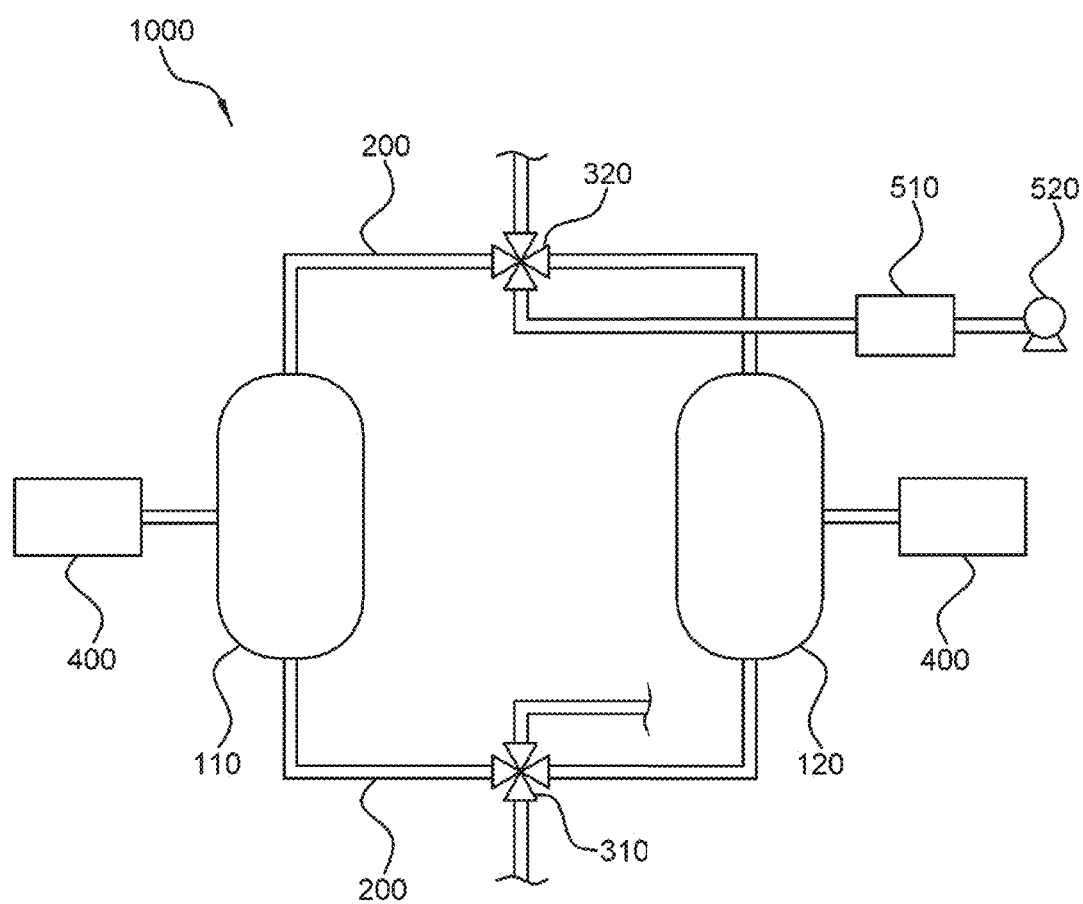
FIGS. 3 to 5 are diagrams for explaining drying and regeneration processes of the drying apparatus according to the present invention.
Figure 4:
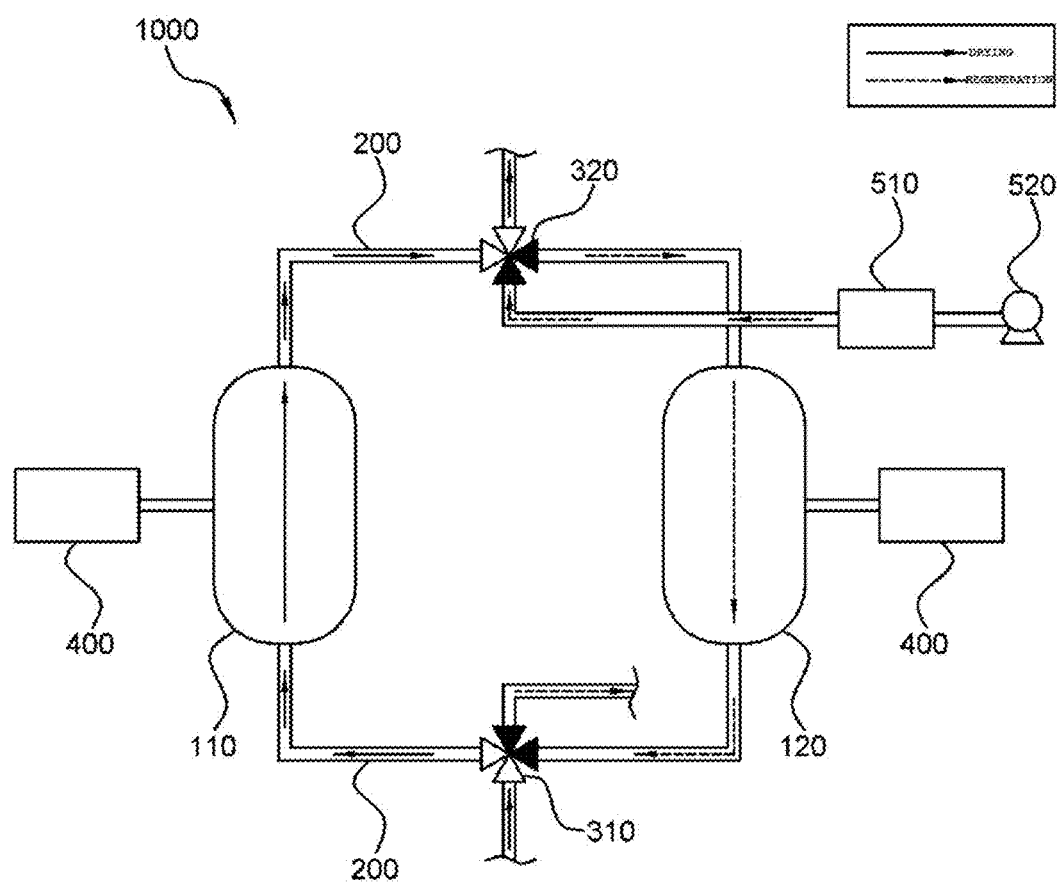
Figure 5:
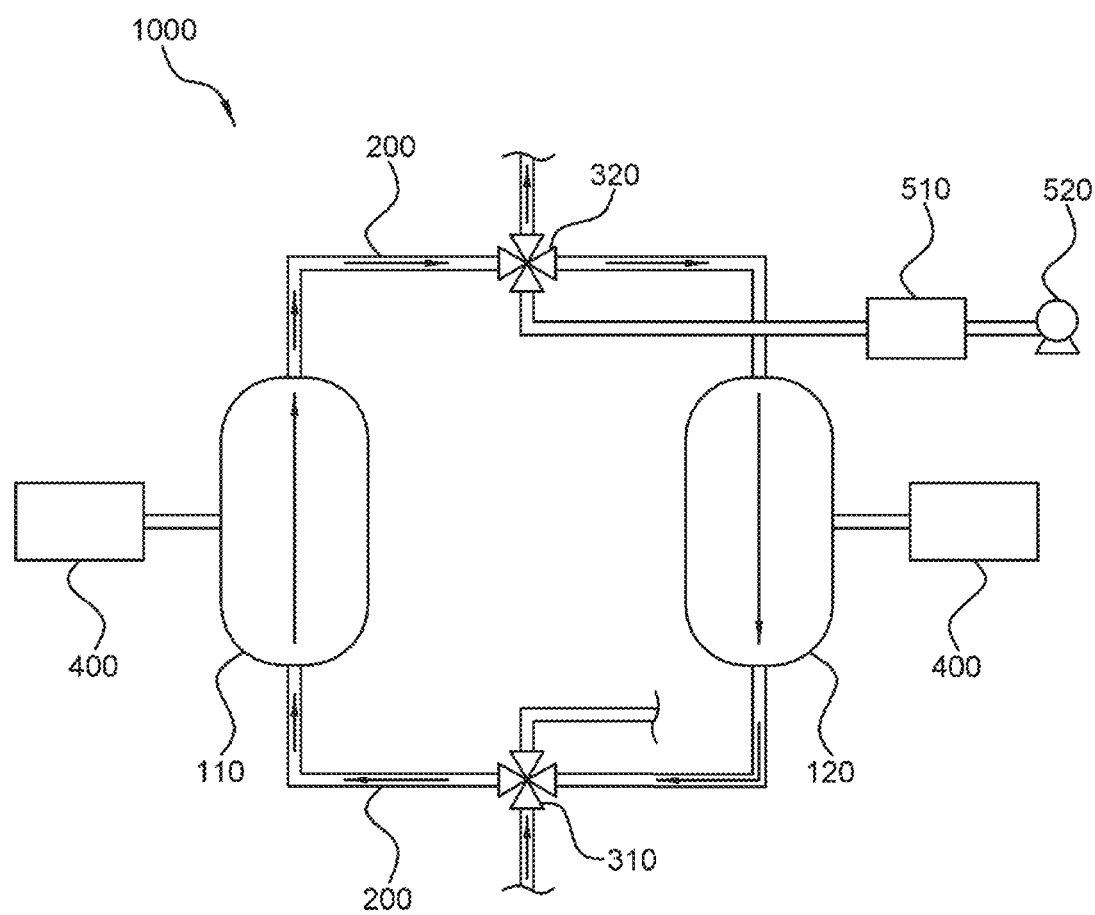

FIGS. 3 to 5 are diagrams for explaining drying and regeneration processes of the drying apparatus according to the present invention. The processes of drying and regeneration of the adsorbent of the present invention will be described in detail with reference to FIGS. 3 to 5.

First, FIG. 3 is a schematic diagram for explaining the process of the drying apparatus of the present invention. As described above, the drying apparatus of the present invention is formed to include the plurality of reaction towers 100, the pipe 200, the valves 310 and 320, and the microwave irradiation portion 400, and may further include, on the pipe 200, a regeneration air supply portion 520 supplying air for regeneration of the adsorbent and a heating portion 510 heating the regeneration air. Although a heating method of a heater blower type is shown in FIG. 3, a heater type dryer or a non-purge type dryer may be used in addition to the blower type.

FIG. 4 shows the flow of air when the first reaction tower 110 performs drying and the second reaction tower 120 performs heating and regeneration of the adsorbent as an example of the processes of drying and regeneration of the adsorbent in which the flow of air on which drying is performed is indicated by a solid line, and the flow of air for indirect heating (regeneration) through the regeneration air supply portion 520 and the heating portion 510 is indicated by a dotted line. At this time, the microwave irradiation portion 400 provided in the second reaction tower 120 operates to directly heat the adsorbent inside the second reaction tower 120. That is, the drying apparatus 1000 of the present invention may simultaneously perform indirect heating in which heated air is supplied to the reaction tower 120 where regeneration is performed through the regeneration air supply portion 520 and the heating portion 510 and direct heating through the microwave irradiation portion 400 when performing heating for regeneration of the adsorbent, thereby greatly reducing a heating time for regeneration of the adsorbent.

On the other hand, after heating for the regeneration of the adsorbent, a process of cooling the adsorbent of which temperature has risen is required, and FIG. 5 shows a process of cooling the adsorbent by supplying part of the dry air that has passed through the first reaction tower 110 to the second reaction tower 120 after the heating process is completed for regeneration of the adsorbent in the second reaction tower 120. That is, after the adsorbent is heated, the air that has passed through the first reaction tower 110 in which drying is performed is supplied to the second reaction tower 120 in which regeneration of the adsorbent is performed by the operation of the valves 310 and 320, and the heated second reaction tower 120 and the adsorbent are cooled to prepare for a next round of adsorption drying. At this time, when a cooling time for the next round of adsorption drying is sufficient, the adsorbent and the second reaction tower 120 may be sufficiently cooled through natural cooling even without using a large amount of air that has passed through the first reaction tower 110, but when the cooling time for the next round of adsorption drying is not sufficient, a large amount of dry air is inevitably supplied to the second reaction tower 120 to perform cooling, and accordingly, the drying efficiency decreases as much. As described above, the drying apparatus 1000 of the present invention may simultaneously perform indirect heating in which heated air is supplied to the reaction tower 120 where regeneration is performed and direct heating through the microwave irradiation portion 400, thereby greatly reducing the heating time for regeneration of the adsorbent, and may shorten the heating time during one adsorbent regeneration cycle including heating and cooling, thereby securing more cooling time, and thus the cooling process may be performed with only a minimum amount of dry air, thereby greatly increasing the drying efficiency.

Figure 6:
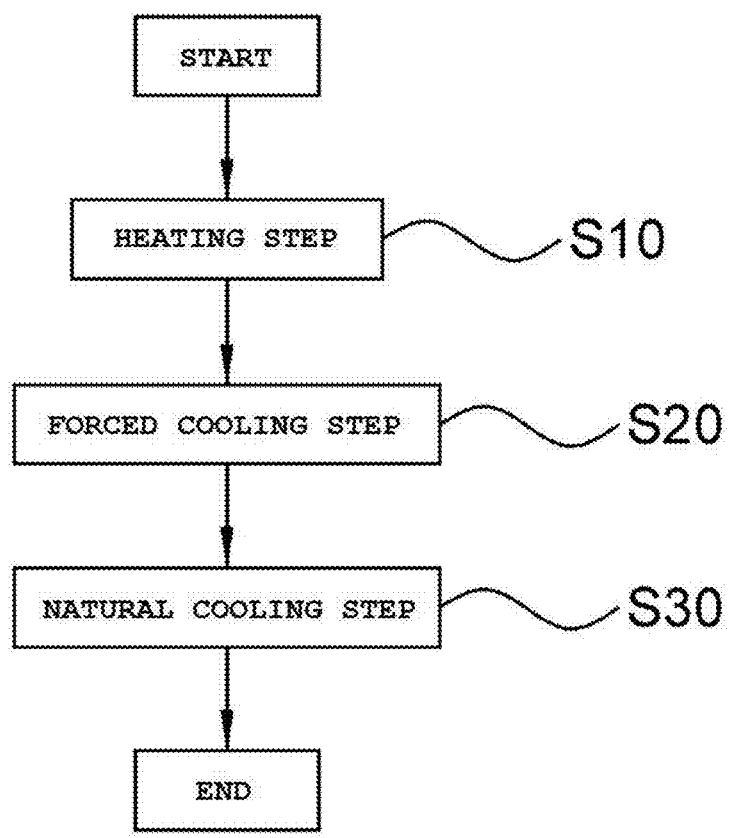
FIG. 6 is a flowchart of an adsorbent regeneration method according to the present invention.

FIG. 6 is a flowchart of an adsorbent regeneration method according to the present invention. The adsorbent regeneration method of the present invention is configured to include a heating step (S10), a forced cooling step (S20) and a natural cooling step (S30).

First, the heating step (S10) is a step of indirectly heating the adsorbent by supplying heated air for regeneration of the adsorbent through the regeneration air supply portion 520 and the heating portion 510, and directly heating the adsorbent by operating the microwave irradiation portion 400.

Next, the forced cooling step (S20) is a step of, after the heating step (S10), supplying the air that has passed through a reaction tower in which drying is performed to another reaction tower in which regeneration of the adsorbent is performed by the operation of the valves 310 and 320. Next, the natural cooling step (S30) is a step of, after the forced cooling step (S20), naturally cooling the adsorbent and the reaction tower while waiting for the remaining drying time of the reaction tower where drying is performed. In the present invention, the natural cooling step (S30) may be maintained without any operation of all of other devices, or may be performed by operating only the regeneration air supply portion 520 without the operation of the heating portion 510.

As described above, the adsorbent regeneration method according to the present invention may greatly reduce the heating time through direct heating using microwaves, and the sufficient cooling time may be secured for one cycle, and thus the forced cooling time using dry air may be minimized, thereby increasing the drying efficiency. For example, in the case of a drying/adsorbent regeneration cycle of 4 hours, in the existing adsorbent regeneration process, the heating step takes 2.5 hours and forced cooling takes 1.5 hours, whereas, the adsorbent regeneration process according to the present invention may obtain the sufficient adsorbent regeneration effect by shortening the heating step (S10) to less than 1.5 hours, allocating time less than 1.5 hours to forced cooling, and allocating time equal to or more than 1 hour to natural cooling, and may further increase the drying efficiency by reducing the time required for the forced cooling step (S20) and reducing an amount of consumption of dried air. The cycle time is an example, and it is possible to adjust the total cycle time and the time of each step by selecting an indirect heating system and a microwave direct heating system.

Figure 7:
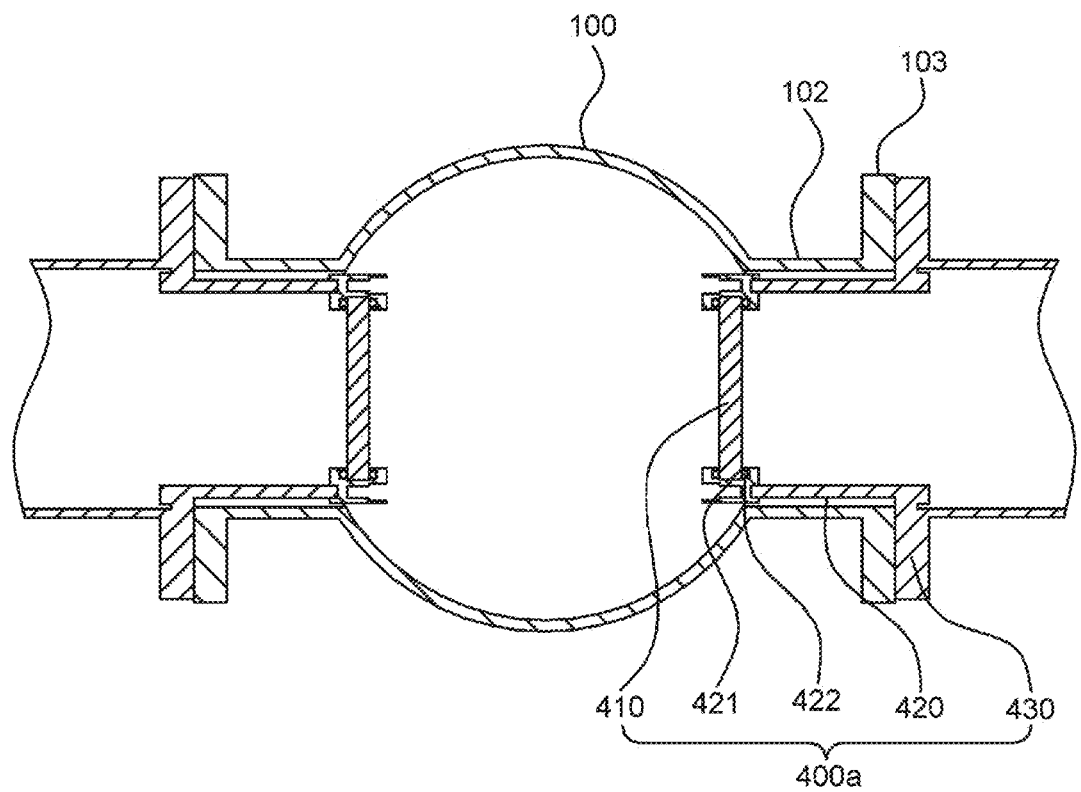
FIGS. 7 and 8 are diagrams for explaining a nozzle-inserted microwave waveguide of the drying apparatus according to an embodiment of the present invention.
Figure 8:
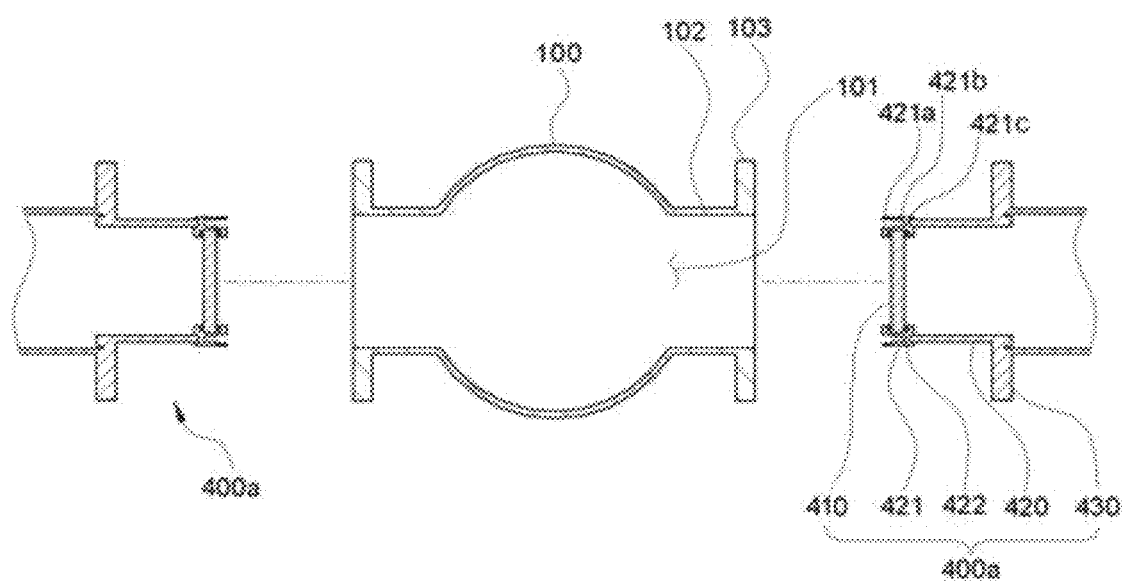

On the other hand, in order to directly heat the adsorbent using microwaves, microwaves need to be transmitted to the inside of the reaction tower, and the drying apparatus of the present invention has a feature of inserting a microwave waveguide into the reaction tower to transmit microwaves and block the gas inside. FIGS. 7 and 8 are diagrams for explaining a nozzle-inserted microwave waveguide of the drying apparatus according to an embodiment of the present invention. Referring to FIGS. 7 and 8, in the air drying apparatus 1000 using microwaves of the present invention, a hollow portion 101 in which a certain region provided with the irradiation portion 400 is hollow is formed in the reaction tower 100 so as to directly irradiate microwaves to the adsorbent inside the reaction tower 100 and directly heat the adsorbent. In addition, in the reaction tower 100, a protrusion guide 102 protruding outward from an inner circumferential surface of the hollow portion 101 and a protrusion seating portion 103 in which an end circumference of the protrusion guide 102 of the reaction tower 100 extends may be formed for mounting of a waveguide 400a.

The waveguide 400a of the microwave irradiation portion 400 is a configuration having a predetermined region inserted through the hollow portion 101 and transmitting microwaves to the adsorbent. The waveguide 400a includes a transmission plate 410 positioned inside the reaction tower 100 through the hollow portion 101 and allowing microwaves to pass therethrough, an insertion portion 420 inserted along the inside of the protrusion guide 102, and a fixing portion 421 provided at the end of the reaction tower 100 of the insertion portion 420 and fixing the transmission plate 410.

The transmission plate 410 has a plate shape that blocks a region of the hollow portion 101 of the reaction tower 100, is formed of a material through which microwaves may pass, and is formed of a material through which the gas inside the reaction tower 100 may not pass.

The insertion portion 420 is a configuration inserted along the protrusion guide 102 integrally formed in the reaction tower 100 to support the transmission plate 410, and may be formed in a cylindrical shape corresponding to the inner circumferential surface of the protrusion guide 102.

The fixing portion 421 is a portion for fixing the transmission plate 410 and the insertion portion 420. The fixing portion 421 preferably has a combination form including an inner part 421a for fixing the transmission plate 410, an outer part 421b spaced apart by a predetermined region formed to surround the inner part 421a, and a connection part 421c connecting the inner part 421a and the outer part 421b, thereby protecting a fixed part of the fixing portion 421 and the transmission plate 410, and further increasing durability. At this time, a sealing member 422 is further provided between the fixing portion 421 and the transmission plate 410 to prevent the gas inside from leaking.

In addition, in the waveguide 400a, a corresponding portion 430 corresponding to the protrusion seating portion 103 of the reaction tower 100 is formed at an end of the insertion portion 420. That is, the transmission plate 410 is fixed to one end of the insertion portion 420 through the fixing portion 421, and the corresponding portion 430 is formed at the other end to correspond to the protrusion seating portion 103 of the reaction tower 100, and various separate fastening means are fastened to this part so that internal airtightness may be maintained. The protrusion seating portion 103 of the reaction tower 100 and the corresponding portion 430 of the waveguide 400a are fixed to correspond to each other, and thus the waveguide 400a may be inserted to an accurate depth, and sufficient fixing force may be secured.

As described above, the drying apparatus of the present invention has the effect of inserting the microwave waveguide into the reaction tower to heat the adsorbent using microwaves, and blocking internal gas such as air to be dried.

Figure 9:
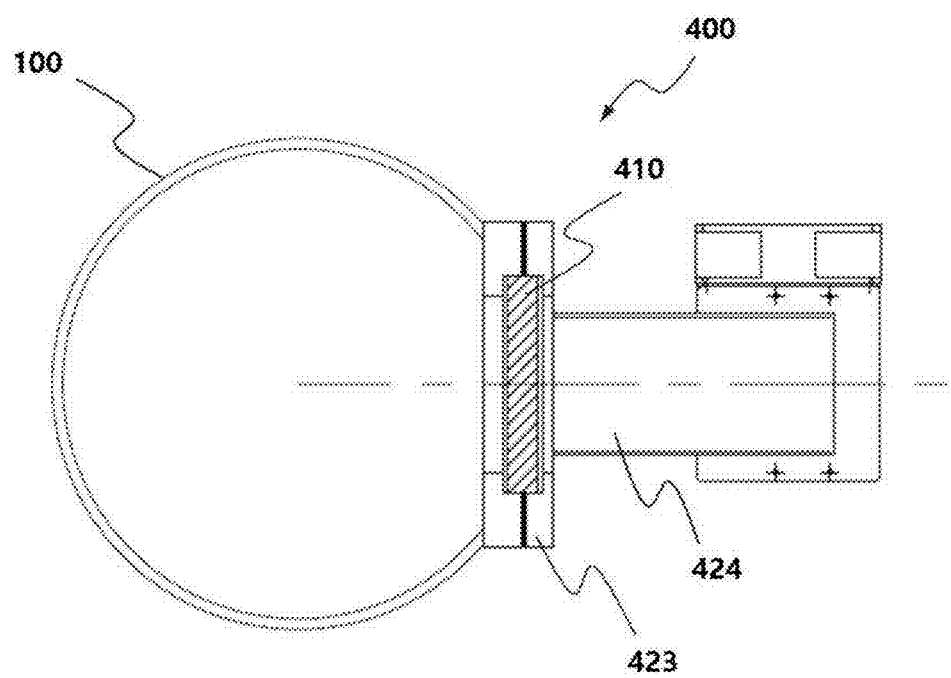
FIGS. 9 and 10 are diagrams for explaining a nozzle-inserted microwave waveguide of the drying apparatus according to another embodiment of the present invention.
Figure 10:
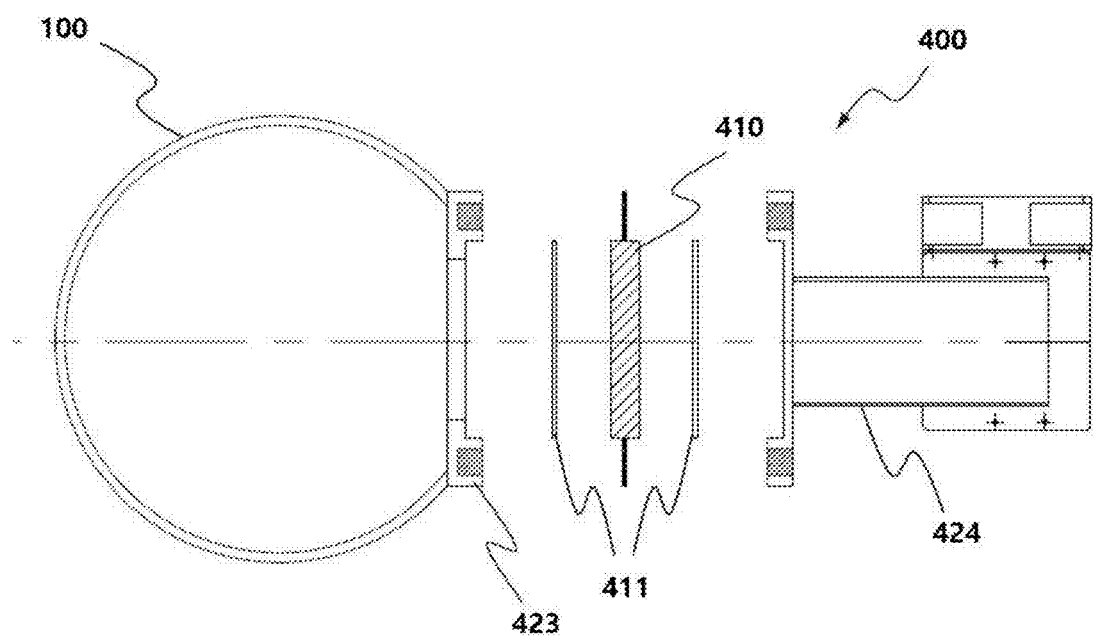

FIGS. 8 and 9 are diagrams for explaining a nozzle-inserted microwave waveguide of the drying apparatus according to another embodiment of the present invention. Referring to FIGS. 8 and 9, the microwave irradiation portion 400 of another embodiment is formed by attaching a welding pad 423 having a through hole formed in one side of the reaction tower 100, inserting the transmission plate 410 of a certain thickness blocking a through hole region of the welding pad 423, and combining a fixing portion integrated microwave apparatus 424 in which a microwave irradiation portion, a waveguide, and a fixing portion are integrally formed with the welding pad 423.

FIG. 9 is an exploded view of the welding pad 423 and the fixing portion integrated microwave apparatus 424. Referring to FIG. 9, while the welding pad 423 having the through hole formed therein is first welded to the reaction tower 100, after the transmission plate 410 is disposed in an inner groove of the welding pad 423, the fixing portion integrated microwave apparatus 424 is combined with the welding pad 423, and thus the transmission plate 410 and the microwave apparatus 424 may be easily combined with the reaction tower 100.

At this time, protection plates 411 are disposed on both sides of an outer surface of the transmission plate 410, and thus leakage of electromagnetic waves may be prevented and the transmission plate 410 may be protected.

Figure 11:
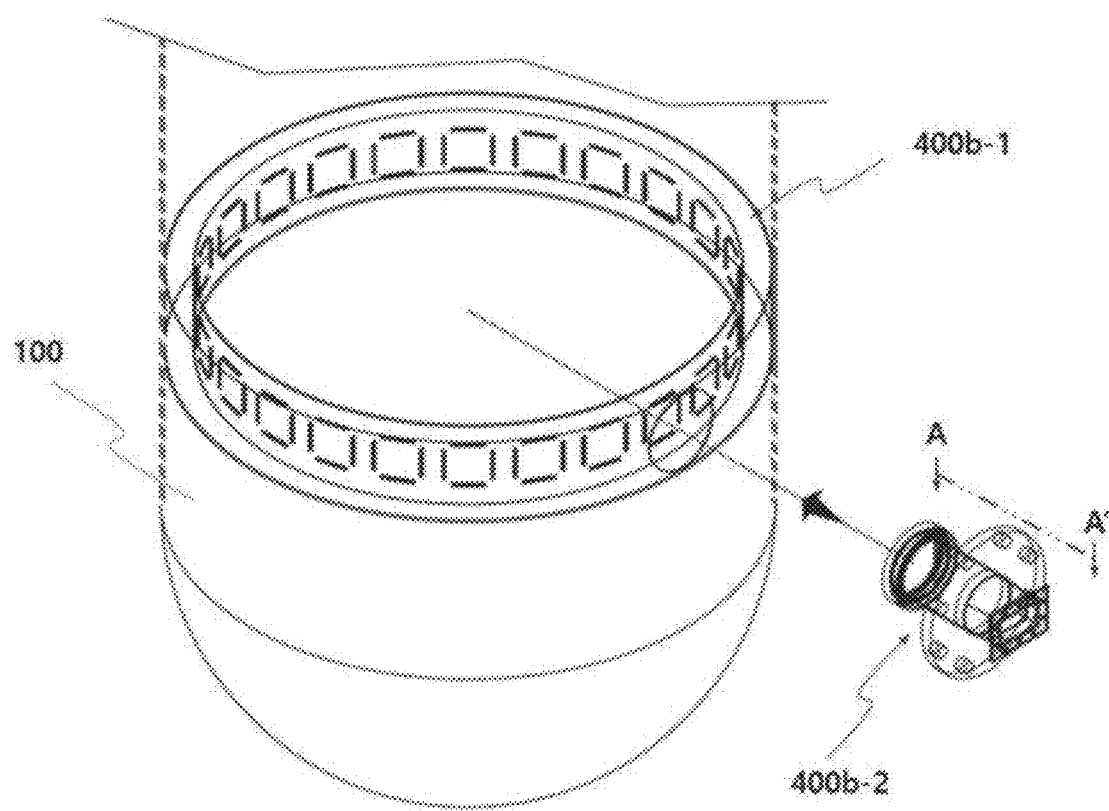
FIGS. 11 to 13 are diagrams for explaining a nozzle-inserted microwave waveguide of the drying apparatus according to another embodiment of the present invention.
Figure 12:
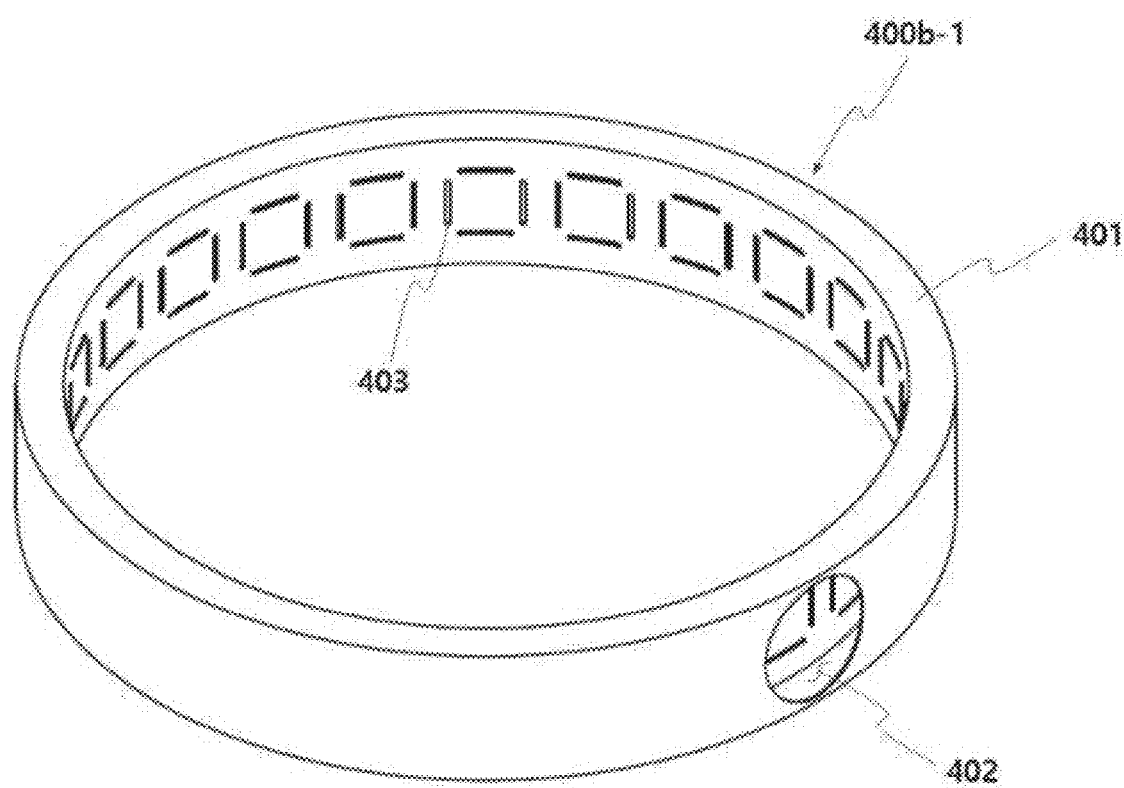
Figure 13:
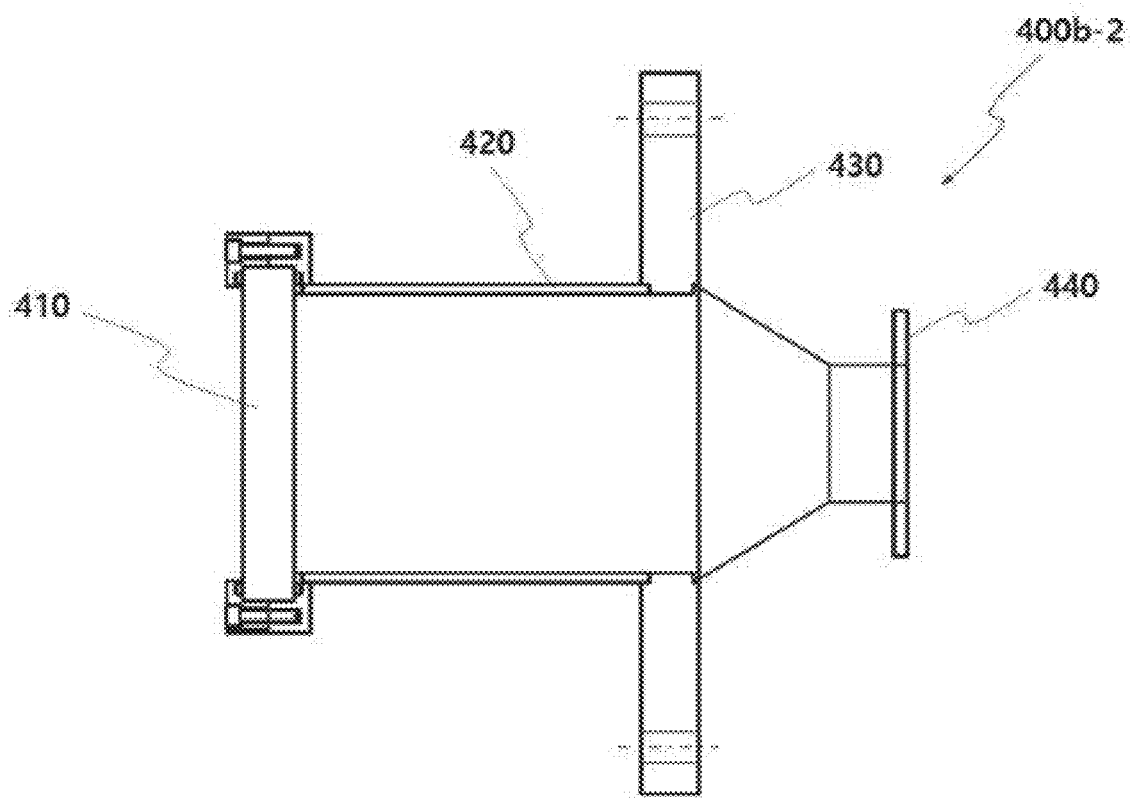

FIGS. 11 to 13 are diagrams for explaining a nozzle-inserted microwave waveguide of the drying apparatus according to another embodiment of the present invention. Referring to FIGS. 11 to 13, a microwave waveguide 400b of another embodiment is configured to include an internal circular waveguide 400b-1 formed in an annular shape inside the reaction tower 100 and an external insertion waveguide 400b-2 inserted into the internal circular waveguide 400b-1.

The internal circular waveguide 400b-1 is for uniformly irradiating irradiated microwaves into the reaction tower 100. Referring to FIG. 12, the internal circular waveguide 400b-1 of the present invention is configured to include a circular waveguide body 401 formed in an annular shape, an insertion hole 402 formed to be hollow on the outer periphery of the circular waveguide body 401 and into which the external insertion waveguide 400b-2 is inserted, and a plurality of slits 403 formed on the inner periphery of the circular waveguide body 401 and irradiating microwaves to the inside. In FIG. 12, the insertion hole 402 is shown in a circular shape, and the shapes of the slits 403 are shown to surround the inner periphery in a rectangular shape, but the shape of the insertion hole 402 and the shapes and arrangement of the slits 403 may be adjusted as necessary.

In addition, a plurality of microwave waveguides 400b each including the internal circular waveguide 400b-1 are disposed in a height direction of the reaction tower 100 to improve microwave output, and thus the direct heating time may be shortened, or the adsorbent inside the reaction tower 100 may be heated evenly.

FIG. 13 is a cross-section of the external insertion waveguide 400b-2 inserted into the internal circular waveguide 400b-1 indicated by A-A' in FIG. 9. Referring to FIG. 13, the external insertion waveguide 400b-2 of the present invention is configured to include the cylindrical insertion portion 420 inserted into the circular waveguide body 401, the transmission plate 410 formed at one end of the cylindrical insertion portion 420 and allowing microwaves to pass through, the corresponding portion 430 formed on the other side of the insertion portion 420 and fixing the external insertion waveguide 400b-2 to the reaction tower 100, and the rectangular connection portion 440 formed on one side of the external insertion waveguide 400b-2 and connecting a magnetron generating microwaves. In the example of FIG. 11, the insertion portion 420, the transmission plate 410, and the corresponding portion 430 are shown to be formed in a cylindrical shape, and the connection portion 440 is shown to be formed in a rectangular shape, but the cross-sectional shapes of the insertion portion 420, the transmission plate 410, the corresponding portion 430, and the connecting portion 440 may be modified in various ways as necessary.

As described above, the transmission plate 410 may be formed of a material through which microwaves may pass, may be formed of a material through which the gas inside the reaction tower 100 may not pass, and may irradiate microwaves from the outside without leakage of internal gas. In particular, in another embodiment of the present invention, the microwave waveguide 400b is formed in a circular shape so that microwaves may be evenly irradiated into the inside of the reaction tower 100, and thus there are advantages of reducing the adsorbent heating time and enhancing the adsorbent regeneration effect.

DESCRIPTION OF REFERENCE NUMERALS

1000: drying apparatus
101: hollow portion
102: protrusion guide
103: protrusion seating portion
100 (110, 120): reaction tower
110: first reaction tower
120: second reaction tower
200: pipe
310, 320: valve
400: microwave irradiation portion
400a, 400b: microwave waveguide
400b-1: internal circular waveguide
400b-2: external insertion waveguide
401: circular waveguide body
402: insertion hole
403: slit
410: transmission plate
411: protection plate
420: insertion portion
421: fixed portion
421a: inner part 421b: outer part 421c: connection part
422: sealing member
423: welding pad
424: fixing portion integrated microwave apparatus
430: corresponding portion
440: magnetron connection portion
510: heating portion
520: regeneration air supply portion

The invention claimed is:

1. A drying apparatus comprising:
at least one reaction tower in which an adsorbent configured to adsorb moisture or carbon dioxide is embedded;
a pipe connected to the at least one reaction tower and configured to transport air;
valves provided on the pipe and configured to control an air flow; and
a microwave irradiation portion configured to irradiate microwaves to the adsorbent inside the at least one reaction tower,
wherein the microwave irradiation portion is configured to operate in the at least one reaction tower in which regeneration of the adsorbent is performed,
wherein a hollow portion is formed in the at least one reaction tower and comprises a certain region provided with the microwave irradiation portion, and
wherein the microwave irradiation portion includes a magnetron configured to selectively irradiate microwaves, and a microwave waveguide configured to transmit microwaves to the adsorbent through the hollow portion.

2. The drying apparatus of claim 1, further including: on the pipe,
a regeneration air supply portion configured to supply air for regeneration of the adsorbent; and
a heating portion configured to heat the air for regeneration.

3. The drying apparatus of claim 2, wherein the heated air for regeneration of the adsorbent is supplied to the at least one reaction tower in which regeneration is performed through the regeneration air supply portion and the heating portion so that the adsorbent is indirectly heated, and the microwave irradiation portion is configured to operate so that the adsorbent is directly heated.

4. The drying apparatus of claim 3, wherein the air that has passed through the at least one reaction tower in which adsorption is performed is supplied to the at least one reaction tower in which regeneration is performed by operations of the valves.

5. The drying apparatus of claim 1,
wherein a protrusion guide configured to protrude outward from an inner circumferential surface of the hollow portion is formed in the at least one reaction tower, and
wherein the microwave waveguide of the microwave irradiation portion includes a transmission plate inserted into the at least one reaction tower through the hollow portion and configured to allow microwaves to pass therethrough, an insertion portion inserted along an inside of the protrusion guide, and a fixing portion provided at an end of the insertion portion and configured to fix the transmission plate.

6. The drying apparatus of claim 5, wherein the microwave waveguide further includes a sealing member between the transmission plate and the fixing portion.

7. The drying apparatus of claim 6, wherein the microwave irradiation portion is provided in plurality in a circumferential direction of the at least one reaction tower or provided in plurality in a height direction.

8. The drying apparatus of claim 1,
wherein a welding pad having a through hole formed in the hollow portion of the at least one reaction tower is welded and attached,
a transmission plate of a certain thickness configured to block a through hole region of the welding pad is inserted and disposed, and
a fixing portion integrated microwave apparatus in which the microwave irradiation portion, the microwave waveguide, and the fixing portion are integrally formed is combined with the welding pad.

9. The drying apparatus of claim 8, wherein protection plates are disposed on both sides of an outer surface of the transmission plate.

10. The drying apparatus of claim 1, wherein the microwave irradiation portion includes a microwave waveguide formed in an annular shape on an inside of the at least one reaction tower.

11. The drying apparatus of claim 10, wherein the microwave waveguide includes an internal circular waveguide formed in an annular shape inside the at least one reaction tower and an external insertion waveguide inserted into the internal circular waveguide.

12. The drying apparatus of claim 11, wherein the internal circular waveguide includes a circular waveguide body formed in an annular shape, an insertion hole formed to be hollow on an outer periphery of the circular waveguide body and into which the external insertion waveguide is inserted, and a plurality of slits formed on an inner periphery of the circular waveguide body and configured to irradiate microwaves to an inside.

13. The drying apparatus of claim 11, wherein the external insertion waveguide includes an insertion portion inserted into a circular waveguide body, a transmission plate formed at one end of the insertion portion and configured to allow microwaves to pass through, a corresponding portion formed on the other side of the insertion portion and configured to fix the external insertion waveguide to the at least one reaction tower, and a connection portion formed on one side of the external insertion waveguide and configured to connect a magnetron configured to generate microwaves.

14. A microwave waveguide for transmitting microwaves into a reaction tower to heat an adsorbent of a drying apparatus, the microwave waveguide comprising:
a transmission plate inserted into the reaction tower through a hollow portion formed in the reaction tower of the drying apparatus and configured to allow microwaves to pass therethrough;
an insertion portion inserted along an inside of a protrusion guide; and
a fixing portion provided at an end of the insertion portion and configured to fix the transmission plate.

15. A microwave waveguide for transmitting microwaves into a reaction tower to heat an adsorbent of a drying apparatus, the microwave waveguide comprising:
an internal circular waveguide formed in an annular shape inside the reaction tower of the drying apparatus; and
an external insertion waveguide inserted into the internal circular waveguide.

16. The microwave waveguide of claim 15, wherein the internal circular waveguide includes a circular waveguide body formed in an annular shape, an insertion hole formed to be hollow on an outer periphery of the circular waveguide body and into which the external insertion waveguide is inserted, and a plurality of slits formed on an inner periphery of the circular waveguide body and configured to irradiate microwaves to an inside.

17. The microwave waveguide of claim 16, wherein the external insertion waveguide includes and insertion portion inserted into the circular waveguide body, a transmission plate formed at one end of the insertion portion and allowing microwaves to pass through, a corresponding portion formed on the other side of the insertion portion and configured to fix the external insertion waveguide to the reaction tower, and a connection portion formed on one side of the external insertion waveguide and configured to connect a magnetron configured to generate microwaves.

* * * * *